US012749744B2

(12) United States Patent
Nishiie et al.

(10) Patent No.: US 12,749,744 B2
(45) Date of Patent: Sep. 29, 2026

(54) SECONDARY BATTERY

(71) Applicant: MURATA MANUFACTURING CO., LTD., Kyoto (JP)

(72) Inventors: Daiki Nishiie, Kyoto (JP); Yoshiichi Horikoshi, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 583 days.

(21) Appl. No.: 18/234,560

(22) Filed: Aug. 16, 2023

(65) Prior Publication Data

US 2023/0395907 A1 Dec. 7, 2023

Related U.S. Application Data

(63) Continuation of application No. PCT/JP2021/047214, filed on Dec. 21, 2021.

(30) Foreign Application Priority Data

Mar. 31, 2021 (JP) ................................ 2021-060140

(51) Int. Cl.
*H01M 50/153* (2021.01)
*H01M 10/0525* (2010.01)
(Continued)

(52) U.S. Cl.
CPC ..... *H01M 50/153* (2021.01); *H01M 10/0525* (2013.01); *H01M 50/109* (2021.01); (Continued)

(58) Field of Classification Search
None
See application file for complete search history.

(56) References Cited

U.S. PATENT DOCUMENTS

2009/0311594 A1 12/2009 Uh
2012/0270098 A1 10/2012 Yamauchi et al.
2014/0178746 A1 6/2014 Ono

FOREIGN PATENT DOCUMENTS

JP 2005056648 A 3/2005
JP 2008251206 A 10/2008
(Continued)

OTHER PUBLICATIONS

Machine translation of JP2012142161 (Year: 2012).*
(Continued)

*Primary Examiner* — Wyatt P McConnell
(74) *Attorney, Agent, or Firm* — K&L Gates LLP

(57) ABSTRACT

A secondary battery includes an outer package member, a battery device, an electrode terminal, and an adhesive member. The battery device is contained inside the outer package member. The electrode terminal is disposed on an outer side of the outer package member. The adhesive member has an insulating property and is disposed between the electrode terminal and the outer package member. The outer package member includes a container part and a cover part. The container part has an opening and contains the battery device inside. The cover part closes the opening and is joined to the container part. A portion or all of a peripheral end part of the electrode terminal is adhered to the cover part via the adhesive member. The electrode terminal has a thickness greater than a thickness of the cover part.

14 Claims, 5 Drawing Sheets

(51) Int. Cl.

| | |
|---|---|
| ***H01M 50/109*** | (2021.01) |
| ***H01M 50/545*** | (2021.01) |
| ***H01M 50/559*** | (2021.01) |
| ***H01M 50/564*** | (2021.01) |

(52) U.S. Cl.
CPC ....... *H01M 50/545* (2021.01); *H01M 50/559* (2021.01); *H01M 50/564* (2021.01)

(56) References Cited

FOREIGN PATENT DOCUMENTS

| | | | |
|---|---|---|---|
| JP | 2008305573 | A | 12/2008 |
| JP | 2009087693 | A | 4/2009 |
| JP | 2009104925 | A | 5/2009 |
| JP | 2009302056 | A | 12/2009 |
| JP | 2012142161 | A | 7/2012 |
| JP | 2014127277 | A | 7/2014 |
| JP | 2015210877 | A | 11/2015 |

OTHER PUBLICATIONS

Japanese Office Action issued Apr. 2, 2024 in corresponding Japanese Application No. 2023-510249.

International Search Report of corresponding PCT application PCT/JP2021/047214, dated Feb. 15, 2022.

* cited by examiner

SECONDARY BATTERY

CROSS REFERENCE TO RELATED APPLICATIONS

The present application is a continuation of PCT patent application no. PCT/JP2021/047214, filed on Dec. 21, 2021, which claims priority to Japanese patent application no. 2021-060140, filed on Mar. 31, 2021, the entire contents of which are herein incorporated by reference.

BACKGROUND

The present application relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a battery device contained inside an outer package member. A configuration of the secondary battery has been considered in various ways.

For example, an electricity generating element is contained inside a jacket having a rectangular columnar shape, the jacket has an open surface closed by a lid member, an external terminal member is attached to the lid member, and the external terminal member protrudes outward from the lid member. An electrode body, for example, is contained inside a battery outer can, an opening-sealing plate is fixed to an opening of the battery outer can, and an external terminal is attached to the opening-sealing plate.

An electrode assembly, for example, is contained inside a case body, a cover body is joined to an opening edge of the case body, and the cover body includes a thick part. A power generation device, for example, is contained inside an outer package can having a cylindrical shape, a sealing plate is disposed in an opening end part of the outer package can, and the sealing plate includes a thick part.

SUMMARY

The present application relates to a secondary battery.

Although consideration has been given in various ways in relation to a configuration of a secondary battery, a deformation resistance characteristic of the secondary battery still remains insufficient. Accordingly, there is room for improvement in terms thereof.

It is therefore desirable to provide a secondary battery that makes it possible to achieve a superior deformation resistance characteristic.

A secondary battery according to an embodiment of the present technology includes an outer package member, a battery device, an electrode terminal, and an adhesive member. The battery device is contained inside the outer package member. The electrode terminal is disposed on an outer side of the outer package member. The adhesive member has an insulating property and is disposed between the electrode terminal and the outer package member. The outer package member includes a container part and a cover part. The container part has an opening and contains the battery device inside. The cover part closes the opening and is joined to the container part. A portion or all of a peripheral end part of the electrode terminal is adhered to the cover part via the adhesive member. The electrode terminal has a thickness greater than a thickness of the cover part.

According to the secondary battery of an embodiment of the present technology, the battery device is contained inside the outer package member, the electrode terminal is disposed on the outer side of the outer package member, the adhesive member having an insulating property is disposed between the outer package member and the electrode terminal, the outer package member includes the cover part joined to the container part, a portion or all of the peripheral end part of the electrode terminal is adhered to the cover part via the adhesive member, and the thickness of the electrode terminal is greater than the thickness of the cover part. Accordingly, it is possible to achieve a superior deformation resistance characteristic according to an embodiment.

Note that effects of the present technology are not necessarily limited to those described herein and may include any of a series of suitable effects in relation to the present technology.

DETAILED DESCRIPTION

One or more embodiments of the present technology are described below in further detail including with reference to the drawings.

A description is given first of a secondary battery according to an embodiment of the present technology.

The secondary battery to be described here has a columnar three-dimensional shape. As will be described later, the secondary battery includes two bottom parts opposed to each other, and a sidewall part coupled to each of the two bottom parts.

Here, the secondary battery is what is called a coin-type or button-type secondary battery, and has a height smaller than an outer diameter. The "outer diameter" is a diameter (a maximum diameter) of each of the two bottom parts. The "height" is a distance (a maximum distance) from one of the bottom parts to another of the bottom parts.

Although a charge and discharge principle of the secondary battery is not particularly limited, the following description deals with a case where a battery capacity is obtained through the use of insertion and extraction of an electrode reactant. The secondary battery includes a positive electrode, a negative electrode, and an electrolyte. In the secondary battery, a charge capacity of the negative electrode is greater than a discharge capacity of the positive electrode. In other words, an electrochemical capacity per unit area of the negative electrode is set to be greater than an electrochemical capacity per unit area of the positive electrode. This is to prevent precipitation of the electrode reactant on a surface of the negative electrode during charging.

Although not particularly limited in kind, the electrode reactant is specifically a light metal such as an alkali metal or an alkaline earth metal. Specific examples of the alkali metal include lithium, sodium, and potassium. Specific examples of the alkaline earth metal include beryllium, magnesium, and calcium.

Examples are given below of a case where the electrode reactant is lithium. A secondary battery that obtains the battery capacity through the use of insertion and extraction of lithium is what is called a lithium-ion secondary battery. In the lithium-ion secondary battery, lithium is inserted and extracted in an ionic state.

Figure 1:
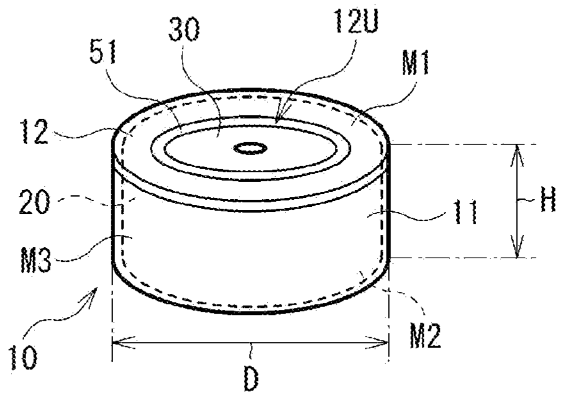
FIG. 1 is a perspective view of a configuration of a secondary battery according to an embodiment of the present technology.
Figure 2:
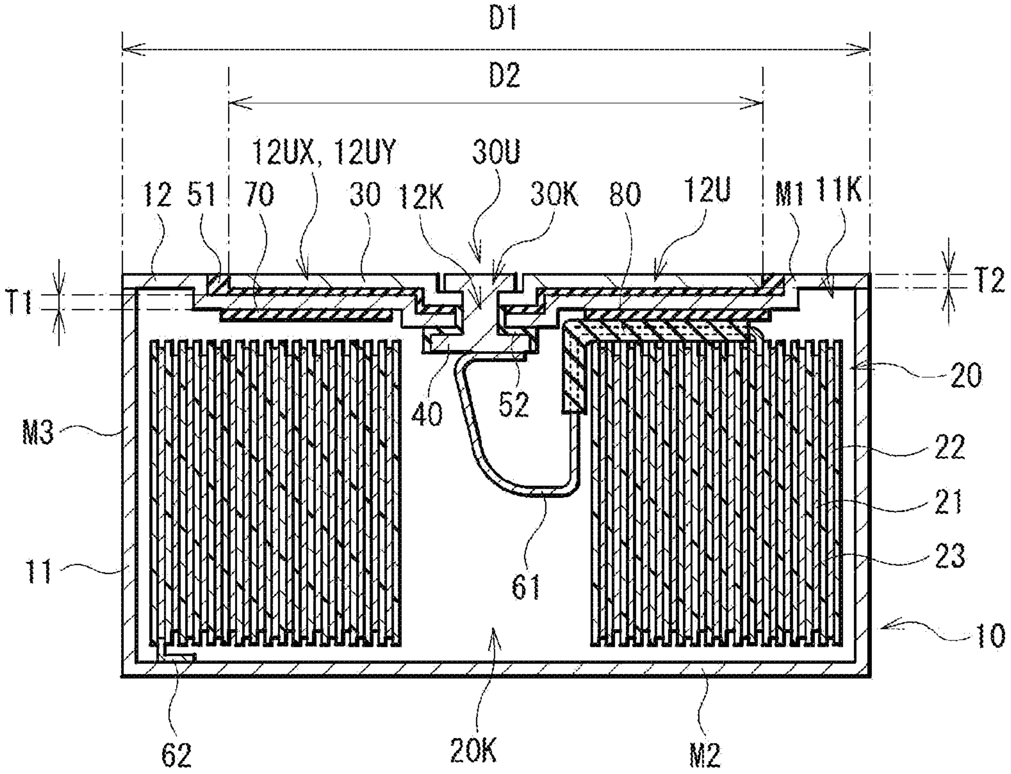
FIG. 2 is an enlarged sectional view of the configuration of the secondary battery illustrated in FIG. 1.
Figure 3:
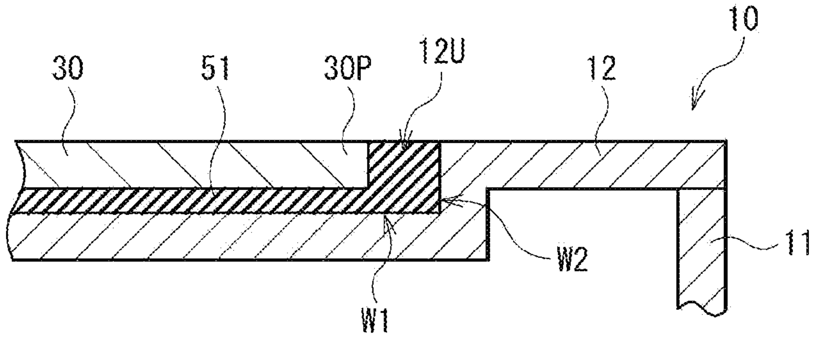
FIG. 3 is an enlarged sectional view of a configuration of a portion of the secondary battery illustrated in FIG. 2.
Figure 4:
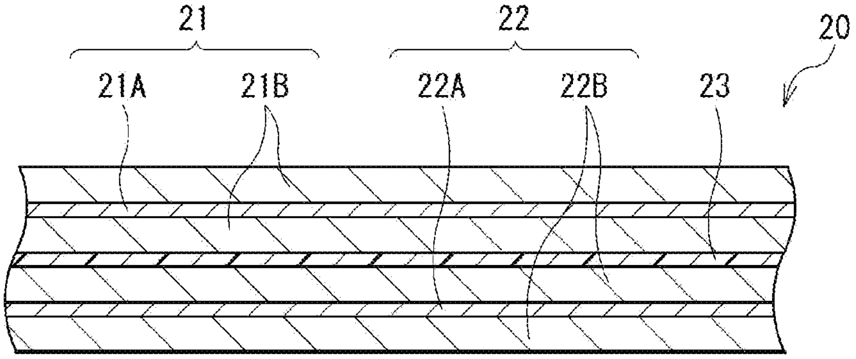
FIG. 4 is an enlarged sectional view of a configuration of a battery device illustrated in FIG. 2.
Figure 5:
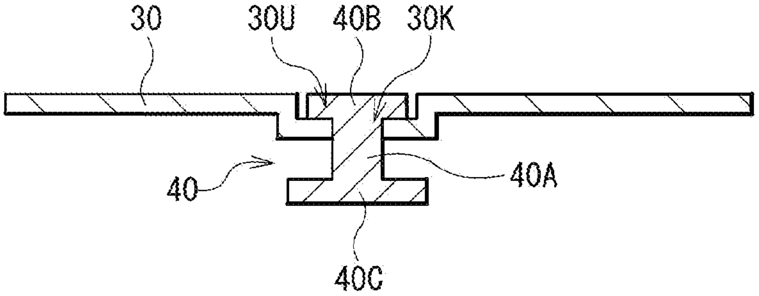
FIG. 5 is an enlarged sectional view of a configuration of each of an external terminal and an auxiliary terminal illustrated in FIG. 2.

FIG. 1 illustrates a perspective configuration of the secondary battery. FIG. 2 illustrates an enlarged sectional configuration of the secondary battery illustrated in FIG. 1. FIG. 3 illustrates a sectional configuration of a portion of the secondary battery illustrated in FIG. 2. FIG. 4 illustrates an enlarged sectional configuration of a battery device 20 illustrated in FIG. 2. FIG. 5 illustrates an enlarged sectional configuration of an external terminal 30 and an auxiliary terminal 40 illustrated in FIG. 2.

Note that FIG. 3 illustrates only respective portions of an outer package can 10 (including a container part 11 and a cover part 12), the external terminal 30, and a gasket 51. FIG. 4 illustrates only a portion of the battery device 20.

In the following description, for convenience, an upper side of FIG. 2 is taken as an upper side of the secondary battery, and a lower side of FIG. 2 is taken as a lower side of the secondary battery.

The secondary battery illustrated in FIG. 1 is of a button-type, and has an outer diameter D and a height H. The secondary battery thus has a three-dimensional shape in which the height H is smaller than the outer diameter D, that is, a flat and columnar three-dimensional shape. Here, the three-dimensional shape of the secondary battery is flat and cylindrical (circular columnar). Accordingly, a ratio D/H of the outer diameter D to the height H is greater than 1.

Specific dimensions of the secondary battery are not particularly limited. For example, the outer diameter D is within a range from 3 mm to 30 mm both inclusive, and the height H is within a range from 0.5 mm to 70 mm both inclusive. Further, the ratio D/H is preferably less than or equal to 25.

As illustrated in FIGS. 1 to 5, the secondary battery includes the outer package can 10, the battery device 20, the external terminal 30, the auxiliary terminal 40, the gasket 51, a gasket 52, a positive electrode lead 61, a negative electrode lead 62, an insulating plate 70, and a sealant 80.

As illustrated in FIGS. 1 to 3, the outer package can 10 is a hollow outer package member to contain the battery device 20 and other components therein.

Here, the outer package can 10 has a flat and cylindrical three-dimensional shape corresponding to the three-dimensional shape of the secondary battery that is flat and cylindrical. Accordingly, the outer package can 10 includes an upper bottom part M1 and a lower bottom part M2 opposed to each other, and a sidewall part M3. The sidewall part M3 is located between the upper bottom part M1 and the lower bottom part M2 and coupled to each of the upper bottom part M1 and the lower bottom part M2. Here, the upper bottom part M1 and the lower bottom part M2 are each circular in plan shape, and a surface of the sidewall part M3 is a curved surface that is convex outward.

The outer package can 10 includes the container part 11 and the cover part 12. The cover part 12 is joined to the container part 11. Here, as will be described later, the cover part 12 is welded to the container part 11.

The container part 11 is a substantially container-shaped member having a flat and cylindrical shape, and contains the battery device 20 and other components inside. The container part 11 corresponds to the lower bottom part M2 and the sidewall part M3. Here, the container part 11 has a structure in which the lower bottom part M2 and the sidewall part M3 are integrated with each other. The container part 11 has a hollow structure with an upper end open and a lower end closed, and thus has an opening 11K in the upper end.

The cover part 12 is a substantially disk-shaped member that closes the opening 11K. The cover part 12 corresponds to the upper bottom part M1, and has an outer diameter D1 and a thickness T1. The cover part 12 is welded to the container part 11 as described above. Thus, the container part 11 is sealed by the cover part 12. Note that the cover part 12 has a through hole 12K to allow the battery device 20 and the external terminal 30 to be coupled to each other.

The outer diameter D1 is an average value of outer diameters of the cover part 12 measured at five locations separated from each other. The thickness T1 is an average value of thicknesses of the cover part 12 measured at five locations separated from each other.

In the secondary battery having been completed, the cover part 12 is already welded to the container part 11 as described above, and the opening 11K is thus closed by the cover part 12. It may thus seem that whether the container part 11 has been provided with the opening 11K is no longer recognizable from an external appearance of the secondary battery.

However, if the cover part 12 is welded to the container part 11, welding marks remain on a surface of the outer package can 10, more specifically, at a boundary between the container part 11 and the cover part 12. Thus, whether the container part 11 has been provided with the opening 11K is recognizable afterward by checking the presence or absence of the welding marks.

Specifically, the welding marks remaining on the surface of the outer package can 10 indicates that the container part 11 has been provided with the opening 11K. In contrast, no welding marks remaining on the surface of the outer package can 10 indicates that the container part 11 has been provided with no opening 11K.

Here, the cover part 12 includes a recessed part 12U. At the recessed part 12U, the cover part 12 is so bent as to be partly recessed toward an inside of the container part 11. Accordingly, a portion of the cover part 12 is so bent as to form a downward step. The cover part 12 thus has a bottom surface W1 and an inner wall surface W2 inside the recessed part 12U.

A shape of the recessed part 12U, that is, a shape defined by an outer edge of the recessed part 12U as viewed from above the secondary battery is not particularly limited. Here, the recessed part 12U has a circular shape. An inner diameter and a depth of the recessed part 12U are not particularly limited, and may be set to any values.

The number of times the cover part 12 is bent to form the recessed part 12U, that is, the number of steps to be formed in the cover part 12, is not particularly limited, and may be only one, or may be two or more. Here, the cover part 12 is so bent partly as to be two-level recessed, that is, a portion of the cover part 12 is bent twice to form two downward steps. Thus, the cover part 12 is two-level recessed.

For example, the recessed part 12U includes a lower recessed part 12UX and an upper recessed part 12UY. The lower recessed part 12UX is located at a center, and the upper recessed part 12UY is located around the lower recessed part 12UX. The lower recessed part 12UX has a depth greater than a depth of the upper recessed part 12UY. The through hole 12K is provided in the lower recessed part 12UX. The bottom surface W1 and the inner wall surface W2 are provided in the upper recessed part 12UY.

As described above, the outer package can 10 includes two members (the container part 11 and the cover part 12) that have been physically separate from each other and are welded to each other. The outer package can 10 is thus what is called a welded can. Accordingly, the outer package can 10 is physically a single member as a whole, and is in a state of being not separable into the two members (the container part 11 and the cover part 12) afterward.

The outer package can 10 as a welded can is different from a crimped can formed by means of crimping processing, and is thus what is called a crimpless can. A reason for employing the crimpless can is that this increases a device space volume inside the outer package can 10, and accordingly increases an energy density per unit volume. The "device space volume" refers to a volume (an effective volume) of an internal space of the outer package can 10 available for containing the battery device 20 therein.

Further, the outer package can 10 as a welded can does not include any portion folded over another portion, and does not include any portion in which two or more members lie over each other.

The wording "does not include any portion folded over another portion" means that the outer package can 10 is not so processed (subjected to bending processing) as to include a portion folded over another portion. The wording "does not include any portion in which two or more members lie over each other" means that the outer package can 10 after completion of the secondary battery is physically a single member and is thus not separable into two or more members afterward. That is, the outer package can 10 in the secondary battery having been completed is not in a state where two or more members lie over each other and are so combined to each other as to be separable afterward.

Here, the outer package can 10 is electrically conductive, and each of the container part 11 and the cover part 12 is thus electrically conductive. The outer package can 10 is electrically coupled to the battery device 20, i.e., a negative electrode 22 to be described later, via the negative electrode lead 62. The outer package can 10 thus serves as an external coupling terminal for the negative electrode 22. A reason for employing such a configuration is that this makes it unnecessary for the secondary battery to be provided with an external coupling terminal for the negative electrode 22 separate from the outer package can 10, and thus suppresses a decrease in device space volume resulting from providing the external coupling terminal for the negative electrode 22. As a result, the device space volume increases, and accordingly, the energy density per unit volume increases.

For example, the outer package can 10, i.e., each of the container part 11 and the cover part 12, includes one or more of electrically conductive materials including, without limitation, a metal material and an alloy material. Examples of the electrically conductive materials include iron, copper, nickel, stainless steel, an iron alloy, a copper alloy, and a nickel alloy. Although the stainless steel is not particularly limited in kind, specific examples of the stainless steel include SUS304 and SUS316. Note that the container part 11 and the cover part 12 may include the same material, or may include respective different materials.

As will be described later, the cover part 12 is insulated, via the gasket 51, from the external terminal 30 serving as an external coupling terminal for a positive electrode 21. A reason for this is that this prevents contact (a short circuit) between the outer package can 10 (the external coupling terminal for the negative electrode 22) and the external terminal 30 (the external coupling terminal for the positive electrode 21).

The battery device 20 is a power generation device that causes charging and discharging reactions to proceed. As illustrated in FIGS. 1, 2, and 4, the battery device 20 is contained inside the outer package can 10. The battery device 20 includes the positive electrode 21, the negative electrode 22, a separator 23, and an electrolytic solution that is a liquid electrolyte. The electrolytic solution is not illustrated.

The battery device 20 to be described here is what is called a wound electrode body. That is, in the battery device 20, the positive electrode 21 and the negative electrode 22 are stacked on each other with the separator 23 interposed therebetween, and the stack of the positive electrode 21, the negative electrode 22, and the separator 23 is wound. The positive electrode 21 and the negative electrode 22 are opposed to each other with the separator 23 interposed therebetween, and are wound. As a result, the battery device 20 has a winding center space 20K that is a winding core part. Here, the positive electrode 21, the negative electrode 22, and the separator 23 are so wound as to allow the separator 23 to be disposed in an outermost wind.

The battery device 20 has a three-dimensional shape similar to the three-dimensional shape of the outer package can 10. The battery device 20 thus has a cylindrical three-dimensional shape. A reason for this is that this helps to prevent a dead space, i.e., a surplus space between the outer package can 10 and the battery device 20, from developing easily when the battery device 20 is placed inside the outer package can 10, and thus allows for efficient use of the internal space of the outer package can 10, as compared with a case where the battery device 20 has a three-dimensional shape different from the three-dimensional shape of the outer package can 10. As a result, the device space volume increases, and accordingly, the energy density per unit volume increases.

As illustrated in FIG. 4, the positive electrode 21 includes a positive electrode current collector 21A and a positive electrode active material layer 21B.

The positive electrode current collector 21A is an electrically conductive support that supports the positive electrode active material layer 21B. The positive electrode current collector 21A has two opposed surfaces on each of which the positive electrode active material layer 21B is provided. The positive electrode current collector 21A includes an electrically conductive material such as a metal material. Examples of the metal material include aluminum.

Here, the positive electrode active material layer 21B is provided on each of the two opposed surfaces of the positive electrode current collector 21A. The positive electrode active material layer 21B includes one or more of positive electrode active materials into which lithium is insertable and from which lithium is extractable. Note that the positive electrode active material layer 21B may be provided only on one of the two opposed surfaces of the positive electrode current collector 21A, on a side where the positive electrode 21 is opposed to the negative electrode 22. The positive electrode active material layer 21B may further include one or more of other materials including, without limitation, a positive electrode binder and a positive electrode conductor. A method of forming the positive electrode active material layer 21B is not particularly limited, and specific examples thereof include a coating method.

The positive electrode active material includes a lithium compound. A reason for this is that a high energy density is obtainable. The lithium compound is a compound including lithium as a constituent element, and more specifically, a compound including lithium and one or more transition metal elements as constituent elements. Note that the lithium compound may further include one or more of other elements, i.e., elements other than lithium and transition metal elements.

Although not particularly limited in kind, the lithium compound is specifically an oxide, a phosphoric acid compound, a silicic acid compound, or a boric acid compound, for example. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes one or more of electrically conductive materials including, without limitation, a carbon material. Examples of the carbon material include graphite, carbon black, acetylene black, and Ketjen black. Note that the electrically conductive material may be a metal material or a polymer compound, for example.

As illustrated in FIG. 4, the negative electrode 22 includes a negative electrode current collector 22A and a negative electrode active material layer 22B.

The negative electrode current collector 22A is an electrically conductive support that supports the negative electrode active material layer 22B. The negative electrode current collector 22A has two opposed surfaces on each of which the negative electrode active material layer 22B is provided. The negative electrode current collector 22A includes an electrically conductive material such as a metal material. Examples of the metal material include copper.

Here, the negative electrode active material layer 22B is provided on each of the two opposed surfaces of the negative electrode current collector 22A. The negative electrode active material layer 22B includes one or more of negative electrode active materials into which lithium is insertable and from which lithium is extractable. Note that the negative electrode active material layer 22B may be provided only on one of the two opposed surfaces of the negative electrode current collector 22A, on a side where the negative electrode 22 is opposed to the positive electrode 21. The negative electrode active material layer 22B may further include one or more of other materials including, without limitation, a negative electrode binder and a negative electrode conductor. Details of the negative electrode binder are similar to those of the positive electrode binder. Details of the negative electrode conductor are similar to those of the positive electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The negative electrode active material includes a carbon material, a metal-based material, or both, for example. A reason for this is that a high energy density is obtainable. Examples of the carbon material include graphitizable carbon, non-graphitizable carbon, and graphite (natural graphite and artificial graphite). The metal-based material is a material that includes, as a constituent element or constituent elements, one or more elements among metal elements and metalloid elements that are each able to form an alloy with lithium. Examples of such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq 2$ or $0.2<x<1.4$).

Here, the negative electrode 22 (the negative electrode active material layer 22B) has a height greater than a height of the positive electrode 21 (the positive electrode active material layer 21B). The negative electrode 22 thus protrudes both upward and downward relative to the positive electrode 21. This is to prevent lithium extracted from the positive electrode 21 during charging from precipitating on the surface of the negative electrode 22. The "height" described here refers to a dimension in a vertical direction in FIG. 2.

The separator 23 is an insulating porous film interposed between the positive electrode 21 and the negative electrode 22, as illustrated in FIG. 4. The separator 23 allows lithium ions to pass therethrough while preventing contact (a short circuit) between the positive electrode 21 and the negative electrode 22. The separator 23 includes a polymer compound such as polyethylene.

Here, the separator 23 has a height greater than the height of the negative electrode 22. The separator 23 thus protrudes both upward and downward relative to the negative electrode 22. A reason for this is that this helps to prevent a short circuit between the positive electrode 21 and the negative electrode 22, and also helps to prevent a short circuit between the outer package can 10, which serves as the external coupling terminal for the negative electrode 22, and the positive electrode 21.

The electrolytic solution includes a solvent and an electrolyte salt. The positive electrode 21, the negative electrode 22, and the separator 23 are each impregnated with the electrolytic solution. The solvent includes one or more of non-aqueous solvents (organic solvents) including, without limitation, a carbonic-acid-ester-based compound, a carboxylic-acid-ester-based compound, and a lactone-based compound. An electrolytic solution including any of the non-aqueous solvents is what is called a non-aqueous electrolytic solution. The electrolyte salt includes one or more of light metal salts including, without limitation, a lithium salt.

As illustrated in FIGS. 1 to 3 and 5, the external terminal 30 is an electrode terminal to be coupled to electronic equipment when the secondary battery is mounted on the electronic equipment. The external terminal 30 has an outer diameter D2 and a thickness T2.

Note that the outer diameter D2 is an average value of outer diameters of the external terminal 30 measured at five locations separated from each other, and the thickness T2 is an average value of thicknesses of the external terminal 30 measured at five locations separated from each other.

The external terminal 30 is disposed on an outer side of the outer package can 10, and is supported by the outer package can 10 via the gasket 51. That is, the external terminal 30 is fixed to the cover part 12 via the gasket 51, and is insulated from the cover part 12 via the gasket 51. As will be described later, the external terminal 30 is thermally welded to the cover part 12 with the gasket 51 interposed therebetween.

Here, the external terminal 30 is electrically coupled to the battery device 20 (the positive electrode 21 described above) via the positive electrode lead 61. The external terminal thus serves as the external coupling terminal for the positive electrode 21. Accordingly, upon use of the secondary battery, the secondary battery is coupled to electronic equipment via the external terminal 30 (the external coupling terminal for the positive electrode 21) and the outer package can 10 (the external coupling terminal for the negative electrode 22). This allows the electronic equipment to operate with use of the secondary battery as a power source.

Further, the external terminal 30 is disposed inside the recessed part 12U so as not to protrude outward relative to the recessed part 12U. A reason for this is that this reduces the height H of the secondary battery and thus increases a volumetric energy density as compared with a case where the external terminal 30 protrudes outward relative to the recessed part 12U.

The external terminal 30 is a substantially plate-shaped member, and has a through hole 30K. Here, the external terminal 30 has a recessed part 30U, and the through hole 30K is provided in the recessed part 30U. At the recessed part 30U, the external terminal 30 is so bent as to be partly recessed toward the inside of the container part 11, and a portion of the external terminal 30 is thus so bent as to form a downward step. Details of the shape of the recessed part 30U are similar to those of the recessed part 12U. Here, the recessed part 30U has a circular shape. Note that an inner diameter and a depth of the recessed part 30U are not particularly limited, and may be set to any values.

The number of steps to be formed in the external terminal 30 is not particularly limited, and may be only one, or may be two or more. Here, the number of steps is one.

In particular, the external terminal 30 has a peripheral end part 30P. The peripheral end part 30P is an end part along an outer edge of the external terminal 30, that is, an end part on an outer side of the external terminal 30. As will be described later, the gasket 51 is disposed not only between a portion of the external terminal 30 other than the peripheral end part 30P and the cover part 12, but also between the peripheral end part 30P and the cover part 12. The external terminal 30 is thus adhered to the cover part 12 via the gasket 51. In particular, the peripheral end part 30P is adhered to the cover part 12 via the gasket 51.

A reason why the peripheral end part 30P, as well as other portions of the external terminal 30, is adhered to the cover part 12 via the gasket 51 is that this prevents the external terminal 30 from being deformed easily upon an increase in internal pressure of the outer package can 10, as compared with a case where the peripheral end part 30P is not adhered to the cover part 12 via the gasket 51. The reason described here will be described in detail later.

Here, the peripheral end part 30P is entirely adhered to the cover part 12 via the gasket 51. Note that only a portion of the peripheral end part 30P may be adhered to the cover part 12 via the gasket 51. A reason for this is that this also provides the above-described advantage as compared with the case where the peripheral end part 30P is not adhered to the cover part 12 via the gasket 51.

Further, the thickness T2 of the external terminal 30 is greater than the thickness T1 of the cover part 12. A reason for this is that this makes the external terminal 30 higher in rigidity than the cover part 12, and thus further prevents the external terminal 30 from being deformed easily upon an increase in the internal pressure of the outer package can 10. The reason described here will also be described in detail later.

Here, the external terminal 30 is disposed inside the recessed part 12U, as described above. Accordingly, the peripheral end part 30P is adhered to the bottom surface W1 via the gasket 51, and to the inner wall surface W2 via the gasket 52. A reason for this is that this further prevents the external terminal 30 from being deformed easily upon an increase in the internal pressure of the outer package can 10.

Note that the external terminal 30 includes one or more of electrically conductive materials including, without limitation, a metal material and an alloy material. Examples of the electrically conductive materials include aluminum and an aluminum alloy.

Note that the external terminal 30 may include a cladding material. The cladding material includes an aluminum layer and a nickel layer that are disposed in this order from a side closer to the gasket 51. The aluminum layer and the nickel layer are roll-bonded to each other. Note that the cladding material may include a nickel alloy layer instead of the nickel layer.

Here, although not particularly limited, a thickness ratio RT (=T1/T2), i.e., a ratio of the thickness T1 of the cover part T1 to the thickness T2 of the external terminal 30, preferably falls within a range from 0.40 to 0.67 both inclusive, in particular. A reason for this is that this makes the thickness ratio RT appropriate, and thus further prevents the external terminal 30 from being deformed easily upon an increase in the internal pressure of the outer package can 10. In this case, in particular, the thickness ratio RT is prevented from being excessively high, which allows for securing of the device space volume, and accordingly, securing of the volumetric energy density. Note that the value of the thickness ratio RT is rounded off to two decimal places.

Further, although not particularly limited, an outer diameter ratio RT (=D2/D1), i.e., a ratio of the outer diameter D2 of the external terminal 30 to the outer diameter D1 of the cover part 12, preferably falls within a range from 0.45 to 0.90 both inclusive, in particular. A reason for this is that this makes the outer diameter ratio RT appropriate, and thus further prevents the external terminal 30 from being deformed easily upon an increase in the internal pressure of the outer package can 10. Note that the value of the outer diameter ratio RT is rounded off to two decimal places.

As illustrated in FIGS. 2 and 5, the auxiliary terminal 40 is a member that couples the external terminal 30 and the positive electrode lead 61 to each other, and is electrically coupled to the external terminal 30. Here, the auxiliary terminal 40 is a substantially rivet-shaped member in which two large outer diameter portions 40B and 40C are coupled to each other with one small outer diameter portion 40A interposed therebetween. That is, the auxiliary terminal 40 has a substantially cylindrical three-dimensional shape in which an outer diameter decreases locally in the middle.

The small outer diameter portion 40A extends through the inside of the through hole 12K, and has an outer diameter smaller than or equal to an inner diameter of the through hole 12K. Further, the small outer diameter portion 40A extends through the through hole 30K, and thus has an inner diameter smaller than or equal to an inner diameter of the through hole 30K. The small outer diameter portion 40A is coupled to the large outer diameter portion 40B and to the large outer diameter portion 40C.

The large outer diameter portion 40B is disposed on the outer side of the cover part 12, more specifically, on the outer side of the external terminal 30. The large outer diameter portion has an outer diameter greater than the inner diameter of each of the through holes 12K and 30K. Here, the large outer diameter portion 40B is disposed inside the recessed part 30U without protruding outward relative to the recessed part 30U. A reason for this is that this reduces the height H of the secondary battery and thus increases the volumetric energy density as compared with a case where the large outer diameter portion 40B protrudes outward relative to the recessed part 30U. The large outer diameter portion 40B is thus coupled to the external terminal 30, and accordingly, the auxiliary terminal 40 is electrically coupled to the external terminal 30, as described above.

The large outer diameter portion 40C is disposed on an inner side of the cover part 12, and has an outer diameter greater than the inner diameter of each of the through holes 12K and 30K. The outer diameter of the large outer diameter portion 40C may be equal to or different from the outer diameter of the large outer diameter portion 40B.

A portion or all of the large outer diameter portion 40C is preferably disposed inside the winding center space 20K. A reason for this is that even if the large outer diameter portion is disposed inside the container part 11, the height of the battery device 20 is secured and accordingly, the volumetric energy density is secured.

In the auxiliary terminal 40, the large outer diameter portions 40B and 40C each have an outer diameter greater than the inner diameter of each of the through holes 12K and 30K. Accordingly, the large outer diameter portions 40B and 40C are each prevented from easily passing through each of the through holes 12K and 30K. This prevents the auxiliary terminal 40 from easily becoming detached from the cover part 12, and thus prevents also the external terminal 30 from easily becoming detached from the cover part 12.

Further, in a state where the small outer diameter portion 40A extends through the inside of the through hole 30K, the auxiliary terminal 40 biases the external terminal 30 upward, that is, in a direction toward the outside of the container part 11, with a pressing force described later. The external terminal 30 is coupled to the large outer diameter portion 40B as described above, and is thus electrically coupled to the auxiliary terminal 40.

Moreover, in the auxiliary terminal 40, the large outer diameter portions 40B and 40C sandwich the cover part 12 and the external terminal 30 from above and below, with the gaskets 51 and 52 interposed therebetween. In this case, in a state where the cover part 12 and the external terminal 30 are opposed to each other with the gaskets 51 and 52 interposed therebetween, the large outer diameter portion 40B presses the external terminal 30 toward the gasket 51, and the large outer diameter portion 40B presses the cover part 12 toward the gasket 51. The external terminal and the auxiliary terminal 40 are thus fixed to the cover part 12 through the use of a pressing force of each of the large outer diameter portions 40B and 40C.

Note that the auxiliary terminal 40 may be omitted. In such a case, the external terminal 30 may have no through hole 30K, and the gasket 52 may be omitted.

The gasket 51 is an insulating adhesive member disposed between the outer package can 10 and the external terminal 30, as illustrated in FIGS. 2 and 3. More specifically, the gasket 51 is disposed between the cover part 12 and the external terminal 30. The external terminal 30 is thus adhered to the cover part 12 via the gasket 51 as described above, and accordingly, the peripheral end part 30P is adhered to the cover part 12 via the gasket 51.

Here, the gasket 51 extends along each of the bottom surface W1 and the inner wall surface W2 inside the recessed part 12U. The gasket 51 is thus disposed between the peripheral end part 30P and the bottom surface W1 and between the peripheral end part 30P and the inner wall surface W2. Accordingly, as described above, the peripheral end part 30P is adhered to each of the bottom surface W1 and the inner wall surface W2 via the gasket 51.

The gasket 51 includes one or more of polymer compounds having an insulating property and a hot melt property. Examples of such a polymer compound include polypropylene. As described above, the external terminal 30 is thermally welded to the cover part 12 with the gasket 51 interposed therebetween. The external terminal 30 is thus fixed to the cover part 12 while being insulated from the cover part 12 via the gasket 51.

Here, the gasket 51 is ring-shaped in a plan view and has a through hole at a location corresponding to each of the through holes 12K and 30K. Note that the plan shape of the gasket 51 is not particularly limited, and may be changed as desired.

As illustrated in FIG. 2, the gasket 52 is disposed between the cover part 12 and the auxiliary terminal 40, and is coupled to the gasket 51. Note that the gasket 52 may not only be disposed in a region between the cover part 12 and the auxiliary terminal 40, but may also be extended to a periphery of the region.

Details of a material included in the gasket 52 and a shape of the gasket 52 are similar to the material included in the gasket 51 and the shape of the gasket 51, respectively. The auxiliary terminal 40 is thermally welded to the cover part 12 with the gasket 52 interposed therebetween. Thus, the auxiliary terminal 40 is fixed to the cover part 12 while being insulated from the cover part 12 via the gasket 52.

As illustrated in FIG. 2, the positive electrode lead 61 is a coupling wiring line for the positive electrode 21, being contained inside the outer package can 10 and coupling the positive electrode 21 to the external terminal 30. The positive electrode lead 61 is coupled to the positive electrode current collector 21A, and is coupled to the external terminal 30 via the through hole 12K.

Here, the secondary battery includes one positive electrode lead 61. Note that the secondary battery may include two or more positive electrode leads 61. A reason for this is that an increase in the number of the positive electrode leads 61 results in a decrease in electric resistance of the battery device 20.

Details of a material included in the positive electrode lead 61 are similar to the details of the material included in the positive electrode current collector 21A. Note that the material included in the positive electrode lead 61 and the material included in the positive electrode current collector 21A may be the same as or different from each other.

Note that the positive electrode lead 61 is physically separate from the positive electrode current collector 21A and is thus provided separately from the positive electrode current collector 21A. Alternatively, the positive electrode lead 61 may be physically continuous with the positive electrode current collector 21A and may thus be provided integrally with the positive electrode current collector 21A.

As illustrated in FIG. 2, the negative electrode lead 62 is a coupling wiring line for the negative electrode 22, being contained inside the outer package can 10 and coupling the negative electrode 22 to the outer package can 10. The negative electrode lead 62 is coupled to the negative electrode current collector 22A, and is coupled to the container part 11.

Here, the secondary battery includes one negative electrode lead 62. Note that the secondary battery may include two or more negative electrode leads 62. A reason for this is that an increase in the number of the negative electrode leads 62 results in a decrease in electric resistance of the battery device 20.

Details of a material included in the negative electrode lead 62 are similar to the details of the material included in the negative electrode current collector 22A. Note that the material included in the negative electrode lead 62 and the material included in the negative electrode current collector 22A may be the same as or different from each other.

Note that the negative electrode lead 62 is physically separate from the negative electrode current collector 22A and is thus provided separately from the negative electrode current collector 22A. Alternatively, the negative electrode lead 62 may be physically continuous with the negative electrode current collector 22A and may thus be provided integrally with the negative electrode current collector 22A.

As illustrated in FIG. 2, the insulating plate 70 is disposed between the cover part 12 and the battery device 20. The insulating plate 70 includes an insulating material such as a polymer compound. Examples of the polymer compound include polyimide.

Note that the insulating plate 70 preferably has a through hole located to overlap a portion or all of the winding center space 20K. A reason for this is that this increases the volumetric energy density for a reason similar to that in the case where the large outer diameter portion 40C is disposed inside the winding center space 20K. A further reason is that, as will be described later, when the electrolytic solution is injected into the container part 11 containing a wound body 20Z (see FIG. 6) in the process of manufacturing the secondary battery, a portion of the electrolytic solution is supplied into the winding center space 20K, which makes it easier for the wound body to be impregnated with the electrolytic solution.

As illustrated in FIG. 2, the sealant 80 is a member that protects the positive electrode lead 61, and has a tube-shaped structure to cover a periphery of the positive electrode lead 61. The sealant 80 includes an insulating material such as a polymer compound. Examples of the polymer compound include polyimide. The positive electrode lead 61 is thus insulated from each of the cover part 12 and the negative electrode 22 via the sealant 80.

The secondary battery operates as described below upon charging and discharging. Upon the charging, in the battery device 20, lithium is extracted from the positive electrode 21, and the extracted lithium is inserted into the negative electrode 22 via the electrolytic solution. Upon the discharging, in the battery device 20, lithium is extracted from the negative electrode 22, and the extracted lithium is inserted into the positive electrode 21 via the electrolytic solution. Upon the charging and the discharging, lithium is inserted and extracted in an ionic state.

Figure 6:
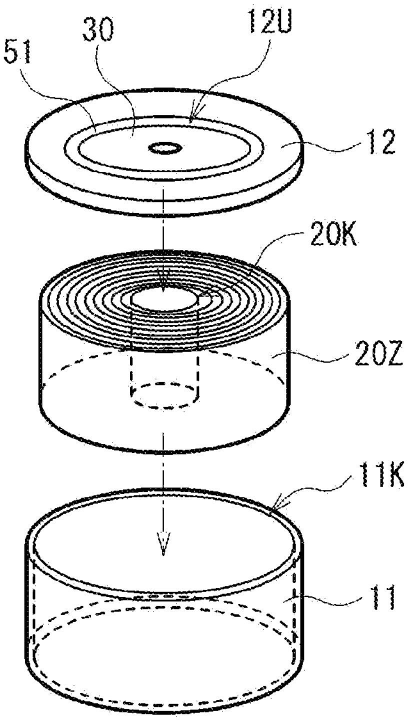
FIG. 6 is a sectional diagram for describing a method of manufacturing the secondary battery.

FIG. 6 illustrates a perspective configuration corresponding to FIG. 1 to describe the process of manufacturing the secondary battery. Note that FIG. 6 illustrates a state where the container part 11 and the cover part 12 are separate from each other. In the following description, where appropriate, FIGS. 1 to 5 described already will be referred to in conjunction with FIG. 6.

In a case of manufacturing the secondary battery, according to an example procedure described below, the positive electrode 21 and the negative electrode 22 are fabricated and the electrolytic solution is prepared, following which the secondary battery is assembled using the positive electrode 21, the negative electrode 22, and the electrolytic solution, and the secondary battery after being assembled is subjected to a stabilization process.

Here, as illustrated in FIG. 6, the container part 11 and the cover part 12 that are physically separate from each other are used to form the outer package can 10. As described above, the container part 11 has the opening 11K. The cover part 12 has the recessed part 12U. The external terminal 30 and the auxiliary terminal 40 are adhered to the cover part 12 via the gaskets 51 and 52 in advance.

First, a positive electrode mixture that is a mixture of the positive electrode active material, the positive electrode binder, and the positive electrode conductor is put into a solvent to thereby prepare a positive electrode mixture slurry in a paste form. The solvent may be an aqueous solvent or an organic solvent. The details of the solvent described here apply also to the description below. Thereafter, the positive electrode mixture slurry is applied on the two opposed surfaces of the positive electrode current collector 21A to thereby form the positive electrode active material layers 21B. Lastly, the positive electrode active material layers 21B are compression-molded by means of, for example, a roll pressing machine. In this case, the positive electrode active material layers 21B may be heated. The positive electrode active material layers 21B may be compression-molded multiple times. In this manner, the positive electrode active material layers 21B are formed on the respective two opposed surfaces of the positive electrode current collector 21A. Thus, the positive electrode 21 is fabricated.

First, a negative electrode mixture that is a mixture of the negative electrode active material, the negative electrode binder, and the negative electrode conductor is put into a solvent to thereby prepare a negative electrode mixture slurry in a paste form. Thereafter, the negative electrode mixture slurry is applied on the two opposed surfaces of the negative electrode current collector 22A to thereby form the negative electrode active material layers 22B. Lastly, the negative electrode active material layers 22B are compression-molded by means of, for example, a roll pressing machine. Details of the compression molding of the negative electrode active material layers 22B are similar to the details of the compression molding of the positive electrode active material layers 21B. In this manner, the negative electrode active material layers 22B are formed on the respective two opposed surfaces of the negative electrode current collector 22A. Thus, the negative electrode 22 is fabricated.

The electrolyte salt is put into the solvent. The electrolyte salt is thereby dispersed or dissolved in the solvent. Thus, the electrolytic solution is prepared.

First, the positive electrode lead 61 whose periphery is covered in part by the sealant 80 is coupled to the positive electrode current collector 21A of the positive electrode 21 by means of, for example, a welding method. Further, the negative electrode lead 62 is coupled to the negative electrode current collector 22A of the negative electrode 22 by means of, for example, a welding method. The welding method includes one or more of methods including, without limitation, a resistance welding method and a laser welding method. The details of the welding method described here apply also to the description below.

Thereafter, the positive electrode 21 and the negative electrode 22 are stacked on each other with the separator 23 interposed therebetween, following which the stack of the positive electrode 21, the negative electrode 22, and the separator 23 is wound to thereby fabricate the wound body 20Z having the winding center space 20K, as illustrated in FIG. 6. The wound body 20Z has a configuration similar to the configuration of the battery device 20 except that the positive electrode 21, the negative electrode 22, and the separator 23 are each unimpregnated with the electrolytic solution.

Thereafter, the wound body 20Z and the insulating plate 70 are placed into the container part 11 through the opening 11K. In this case, the negative electrode lead 62 is coupled to the container part 11 by means of, for example, a welding method.

Thereafter, the electrolytic solution is injected into the container part 11 through the opening 11K. The wound body 20Z (including the positive electrode 21, the negative electrode 22, and the separator 23) is thereby impregnated with the electrolytic solution. Thus, the battery device 20 is fabricated. In this case, a portion of the electrolytic solution is supplied into the winding center space 20K, and the wound body 20Z is thus impregnated with the electrolytic solution from the inside of the winding center space 20K.

Thereafter, the opening 11K is closed with use of the cover part 12 to which the external terminal 30 and the auxiliary terminal 40 are fixed via the gaskets 51 and 52, following which the cover part 12 is joined to the container part 11. Here, the cover part 12 is welded to the container part 11 by means of a welding method. In this case, the positive electrode lead 61 is coupled to the external terminal 30 via the through hole 12K by means of, for example, a welding method.

The container part 11 and the cover part 12 are thus welded to each other. In this manner, the outer package can 10 is formed, and the battery device 20 and other components are placed into the outer package can 10. The secondary battery is thus assembled.

The secondary battery after being assembled is charged and discharged. Various conditions including, for example, an environment temperature, the number of times of charging and discharging (the number of cycles), and charging and discharging conditions, may be chosen as desired. As a result, a film is formed on a surface of each of the positive electrode 21 and the negative electrode 22 in the battery device 20. This brings the secondary battery into an electrochemically stable state.

As a result, the battery device 20 and other components are sealed in the outer package can 10. The secondary battery is thus completed.

According to the secondary battery of the present embodiment, the battery device 20 is contained inside the outer package can 10 including the container part 11 and the cover part 12, the external terminal 30 is disposed on the outer side of the cover part 12, the gasket 51 is disposed between the cover part 12 and the external terminal 30, and the cover part 12 is joined to the container part 11. Further, the peripheral end part 30P is adhered to the cover part 12 via the gasket 51, and the thickness T2 of the external terminal 30 is greater than the thickness T1 of the cover part 12. Accordingly, for a reason described below, it is possible to achieve a superior deformation resistance characteristic.

Figure 7:
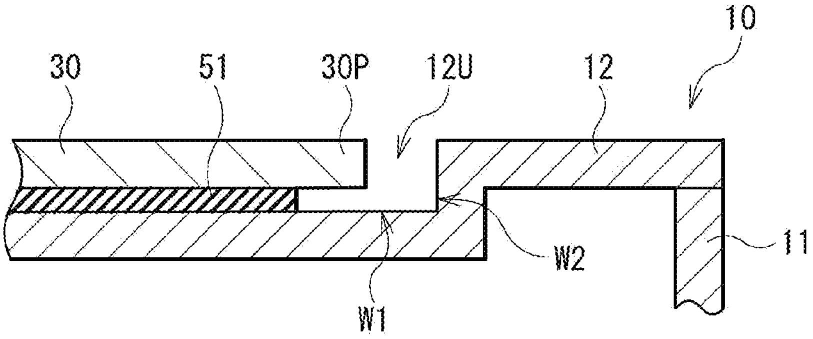
FIG. 7 is an enlarged sectional view of a configuration of a portion of a secondary battery according to a comparative example.
Figure 8:
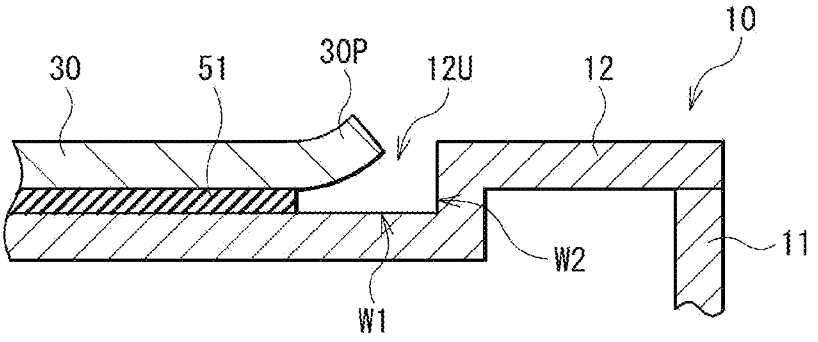
FIG. 8 is a sectional diagram for describing an issue related to the secondary battery according to the comparative example.

FIG. 7 illustrates a sectional configuration of a secondary battery of a comparative example, and corresponds to FIG. 3. FIG. 8 illustrates a sectional configuration corresponding to FIG. 7 to describe an issue related to the secondary battery of the comparative example.

The secondary battery of the comparative example has a configuration similar to the configuration of the secondary battery of the present embodiment illustrated in FIG. 3, except that in the secondary battery of the comparative example, as illustrated in FIG. 7, a range of provision of the gasket 51 is narrow and thus the peripheral end part 30P is not adhered to the cover part 12 via the gasket 51.

In the secondary battery of the comparative example, as with the secondary battery of the present embodiment, the external terminal 30 is adhered to the cover part 12 via the gasket 51, and the external terminal 30 thus serves as an external coupling terminal for the positive electrode 21.

However, the peripheral end part 30P is not adhered to the cover part 12 via the gasket 51, and the peripheral end part 30P thus behaves as a free end part under an external force. As a result, the external terminal 30 is prone to being deformed upon an increase in the internal pressure of the outer package can 10.

In more detail, if the internal pressure of the outer package can 10 increases, the outer package can 10 swells. A cause of an increase in the internal pressure of the outer package can is a large amount of gas generated inside the outer package can 10 due to excessive proceeding of decomposition reaction of the electrolytic solution that occurs in a case where the secondary battery is charged under a large current condition or in a case where the secondary battery is overcharged under a large current condition.

In such a case, the cover part 12 is pushed outward (toward the upper side) due to the increase in the internal pressure, and the external terminal 30 is thus pushed outward by the cover part 12 with the gasket 51 interposed therebetween. As a result, in the external terminal 30, the peripheral end part 30P, which is a free end part that is not adhered to the cover part 12 via the gasket 51, becomes prone to being so deformed as to warp outward, as illustrated in FIG. 8.

In the secondary battery of the comparative example, the external terminal 30 is thus prone to being deformed upon an increase in the internal pressure of the outer package can 10. This makes it difficult to achieve a superior deformation resistance characteristic.

In contrast, in the secondary battery of the present embodiment, as illustrated in FIG. 3, the range of provision of the gasket 51 is wide and thus the peripheral end part 30P is adhered to the covered part 12 via the gasket 51. Accordingly, the peripheral end part 30P behaves as a fixed end part under an external force, which prevents the external terminal 30 from being deformed easily even if the internal pressure of the outer package can 10 increases.

In more detail, even if the external terminal 30 is pushed outward together with the cover part 12 due to swelling of the outer package can 10 in response to the increased internal pressure, it is easy for the peripheral end part 30P as a fixed end part to remain adhered to the cover part 12 via the gasket 51. This helps to prevent the peripheral end part 30P from being so deformed easily as to warp outward.

Moreover, because the thickness T2 of the external terminal 30 is greater than the thickness T1 of the cover part 12, the external terminal 30 is higher in rigidity than the cover part 12. This prevents the external terminal 30 itself from being deformed easily under an external force. Accordingly, the peripheral end part 30P is further prevented from being deformed easily even if the external terminal 30 is pushed outward together with the cover part 12 in response to an increase in the internal pressure.

Accordingly, in the secondary battery of the present embodiment, the external terminal 30 is prevented from being deformed easily upon an increase in the internal pressure of the outer package can 10. This makes it possible to achieve a superior deformation resistance characteristic.

In the secondary battery of the present embodiment, in particular, the thickness ratio RT may fall within the range from 0.40 to 0.67 both inclusive. This makes the thickness ratio RT appropriate. The external terminal 30 is thus further prevented from being deformed easily upon an increase in the internal pressure of the outer package can 10. Accordingly, it is possible to achieve higher effects.

Further, the outer diameter ratio RT may fall within the range from 0.45 to 0.90 both inclusive. This makes the outer diameter ratio RT appropriate. The external terminal 30 is thus further prevented from being deformed easily upon an increase in the internal pressure of the outer package can 10. Accordingly, it is possible to achieve higher effects.

Further, the cover part 12 may include the recessed part 12U, and the external terminal may be disposed inside the recessed part 12U. This allows for an increase in the device space volume, and accordingly, an increase in the volumetric energy density. It is thus possible to achieve higher effects.

In this case, the cover part 12 may have the bottom surface W1 and the inner wall surface W2 inside the recessed part 12U, and the peripheral end part 30P may be adhered to each of the bottom surface W1 and the inner wall surface W2 via the gasket 51. This further prevents the external terminal 30 from being deformed easily upon an increase in the internal pressure of the outer package can 10. Accordingly, it is possible to achieve higher effects.

Further, the battery device 20 may include the positive electrode 21 and the negative electrode 22, the positive electrode 21 may be electrically coupled to the external terminal 30, and the negative electrode 22 may be electrically coupled to the outer package can 10. In such a case, the external terminal 30 serves an external coupling terminal for the positive electrode 21, and the outer package can 10 serves as an external coupling terminal for the negative electrode 22. This makes it easy to electrically couple the secondary battery to electronic equipment via the outer package can 10 and the external terminal 30, and allows for an increase in energy density per unit volume owing to an increase in the device space volume. It is thus possible to achieve higher effects.

Further, the secondary battery may have a flat and columnar shape. This effectively prevents the external terminal 30 from being deformed easily even in a small-sized secondary battery in which an increase in the internal pressure of the outer package can 10 occurs easily. Accordingly, it is possible to achieve higher effects.

Further, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery described herein is appropriately modifiable including as described below according to an embodiment. Note that any two or more of the following series of modifications may be combined with each other.

In FIG. 3, the gasket 51 is disposed between the external terminal 30 and the bottom surface W1, and between the external terminal 30 and the inner wall surface W2. The peripheral end part 30P is thus adhered to each of the bottom surface W1 and the inner wall surface W2 via the gasket 51.

Figure 9:
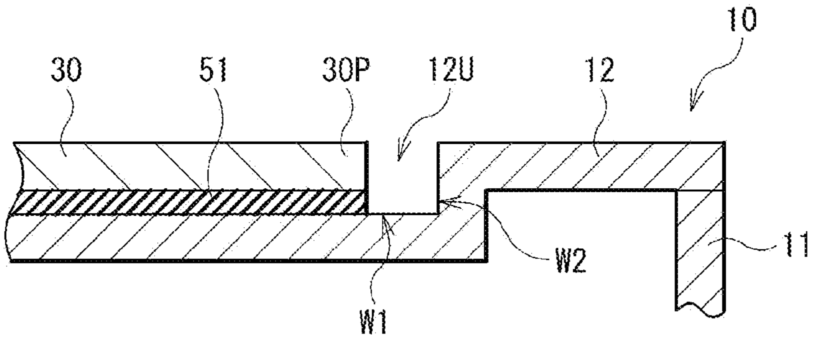
FIG. 9 is a sectional view of a configuration of a secondary battery according to an embodiment of the present technology.

In FIG. 9 corresponding to FIG. 3, however, the gasket 51 is not disposed between the external terminal 30 and the inner wall surface W2, although disposed between the external terminal 30 and the bottom surface W1. Thus, the peripheral end part 30P is adhered, via the gasket 51, to the bottom surface W1 only, and is not adhered to the inner wall surface W2 via the gasket 51.

Even in such a case, the external terminal 30 is prevented from being deformed easily upon an increase in the internal pressure of the outer package can 10. Accordingly, it is possible to achieve effects similar to the effects achieved in the case illustrated in FIG. 3.

Note that, to further suppress deformation of the peripheral end part 30P by adhering the external terminal 30 to the cover part 12 more firmly, it is preferable that the peripheral end part 30P be adhered to each of the bottom surface W1 and the inner wall surface W2 via the gasket 51, as illustrated in FIG. 3.

In FIG. 2, the positive electrode 21 is coupled to the external terminal 30 via the positive electrode lead 61, and the negative electrode 22 is coupled to the container part 11 via the negative electrode lead 62. Thus, the external terminal 30 serves as the external coupling terminal for the positive electrode 21, and the outer package can 10 serves as the external coupling terminal for the negative electrode 22.

Figure 10:
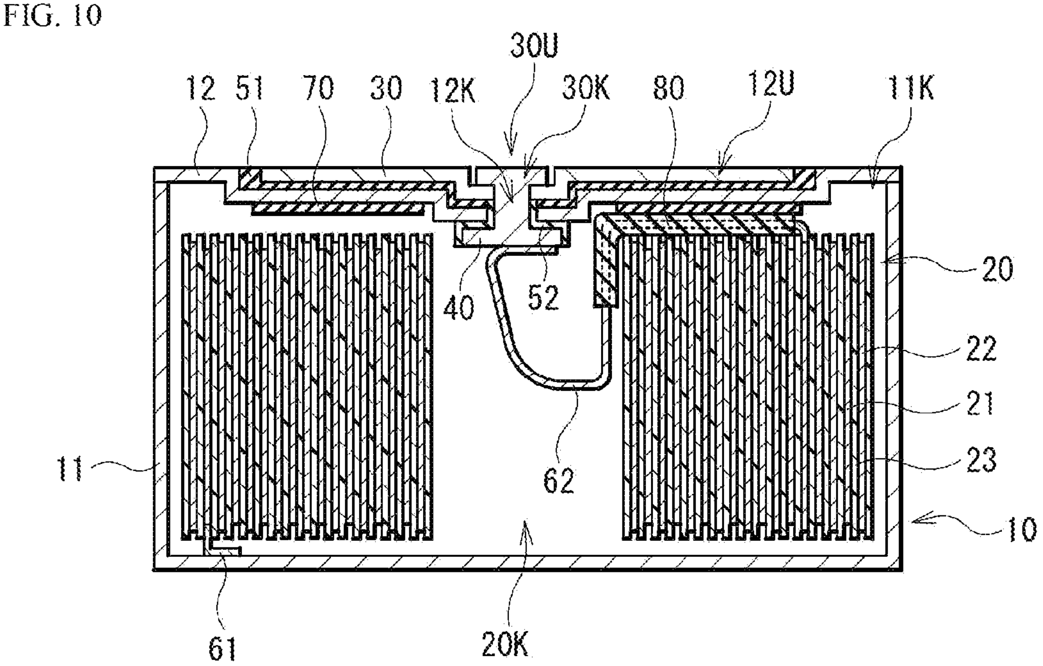
FIG. 10 is a sectional view of a configuration of a secondary battery according to an embodiment of the present technology.

However, as illustrated in FIG. 10 corresponding to FIG. 2, the positive electrode 21 may be coupled to the container part 11 via the positive electrode lead 61, and the negative electrode 22 may be coupled to the external terminal 30 via the negative electrode lead 62. Thus, the outer package can 10 may serve as the external coupling terminal for the positive electrode 21, and the external terminal 30 may serve as the external coupling terminal for the negative electrode 22.

In this case, to serve as the external coupling terminal for the negative electrode 22, the external terminal 30 includes one or more of electrically conductive materials including, without limitation, a metal material and an alloy material. Examples of the electrically conductive materials include iron, copper, nickel, stainless steel, an iron alloy, a copper alloy, and a nickel alloy. To serve as the external coupling terminal for the positive electrode 21, the outer package can 10, that is, each of the container part 11 and the cover part 12, includes one or more of electrically conductive materials including, without limitation, a metal material and an alloy material. Examples of the electrically conductive materials include aluminum, an aluminum alloy, and stainless steel.

In this case also, the secondary battery is couplable to electronic equipment via the external terminal 30, i.e., the external coupling terminal for the negative electrode 22, and the outer package can 10, i.e., the external coupling terminal for the positive electrode 21. Accordingly, it is possible to achieve effects similar to the effects achieved in the case illustrated in FIG. 2.

In this case, in particular, the outer package can 10 may include aluminum, an aluminum alloy, or both. This allows for reduction in weight of the secondary battery. Accordingly, a weight energy density increases, which makes it possible to achieve higher effects.

In FIG. 2, the cover part 12 includes the recessed part 12U, and the external terminal 30 is disposed inside the recessed part 12U.

Figure 11:
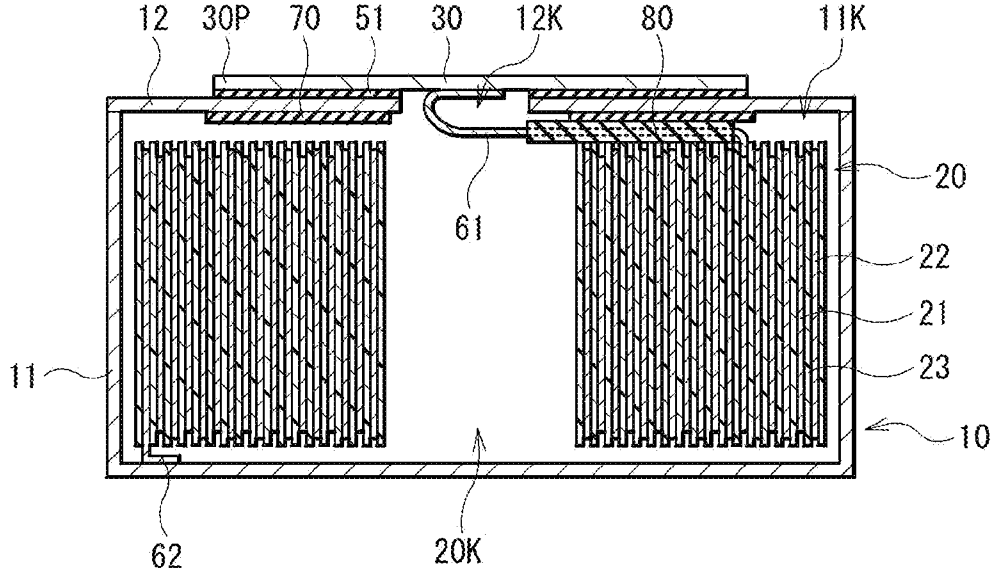
FIG. 11 is a sectional view of a configuration of a secondary battery according to an embodiment of the present technology.

However, as illustrated in FIG. 11 corresponding to FIG. 2, the cover part 12 may include no recessed part 12U. FIG. 11 illustrates a secondary battery having a configuration similar to the configuration of the secondary battery illustrated in FIG. 2, except that neither the auxiliary terminal 40 nor the gasket 52 is provided and that the external terminal 30 is a flat plate-shaped member.

In this case also, the peripheral end part 30P is adhered to the cover part 12 via the gasket 51. This prevents the external terminal 30 from being deformed easily upon an increase in the internal pressure of the outer package can 10. Accordingly, it is possible to achieve effects similar to the effects achieved in the case illustrated in FIG. 2.

The secondary battery illustrated in FIGS. 1 and 2 is a button-type secondary battery having the height H smaller than the outer diameter D. However, although not specifically illustrated here, the secondary battery may be a cylindrical secondary battery having the height H greater than the outer diameter D. The ratio D/H may be set to any value.

In this case also, the external terminal 30 is prevented from being deformed easily upon an increase in the internal pressure of the outer package can 10. Accordingly, it is possible to achieve effects similar to the effects achieved in the case illustrated in FIGS. 1 and 2.

The separator 23 that is a porous film is used. However, although not specifically illustrated here, a separator of a stacked type that includes a polymer compound layer may be used instead of the separator 23.

Specifically, the separator of the stacked type includes a porous film having two opposed surfaces, and the polymer compound layer provided on one of or each of the two opposed surfaces of the porous film. A reason for this is that this improves adherence of the separator to each of the positive electrode 21 and the negative electrode 22, thus suppressing winding displacement of the battery device 20. Accordingly, the secondary battery is prevented from swelling easily even if the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that the insulating particles dissipate heat upon heat generation by the secondary battery, thus improving safety or heat resistance of the secondary battery. The insulating particles are inorganic particles, resin particles, or both. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and a solvent is prepared, following which the precursor solution is applied on one of or each of the two opposed surfaces of the porous film. In this case, instead of applying the precursor solution on the porous film, the porous film may be immersed in the precursor solution. In addition, the insulating particles may be included in the precursor solution.

In the case where the separator of the stacked type is used also, lithium ions are movable between the positive electrode 21 and the negative electrode 22, and similar effects are therefore obtainable. In this case, in particular, the secondary battery improves in safety, as described above. Accordingly, it is possible to achieve higher effects.

The electrolytic solution that is a liquid electrolyte is used. However, although not specifically illustrated here, an electrolyte layer that is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23. Note that the electrolyte layer may be interposed only between the positive electrode 21 and the separator 23, or may be interposed only between the negative electrode 22 and the separator 23.

Specifically, the electrolyte layer includes a polymer compound together with the electrolytic solution. The electrolytic solution is held by the polymer compound. A reason for this is that leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and a solvent is prepared, following which the precursor solution is applied on one of or each of both sides of the positive electrode 21 and on one of or each of both sides of the negative electrode 22.

In the case where the electrolyte layer is used also, lithium ions are movable between the positive electrode 21 and the negative electrode 22 via the electrolyte layer, and similar effects are therefore obtainable. In this case, in particular, leakage of the electrolytic solution is prevented, as described above. Accordingly, it is possible to achieve higher effects.

In FIG. 1, the secondary battery includes the battery device 20 of the wound type, i.e., the wound electrode body. However, although not specifically illustrated here, the secondary battery may include a battery device of a stacked type, i.e., a stacked electrode body.

The battery device of the stacked type has a configuration similar to the configuration of the battery device 20 of the wound type, except for the following.

The battery device of the stacked type includes a positive electrode, a negative electrode, and a separator. The positive electrode and the negative electrode are alternately stacked with the separator interposed therebetween. Accordingly, the battery device of the stacked type includes one or more positive electrodes, one or more negative electrodes, and one or more separators. The positive electrode, the negative electrode, and the separator have respective configurations similar to the respective configurations of the positive electrode 21, the negative electrode 22, and the separator 23.

In a case where the battery device of the stacked type includes a plurality of positive electrodes and a plurality of negative electrodes, a positive electrode lead is coupled to the positive electrode current collector of each of the positive electrodes, and a negative electrode lead is coupled to the negative electrode current collector of each of the negative electrodes. Thus, the secondary battery includes a plurality of positive electrode leads and a plurality of negative electrode leads. The positive electrode leads are joined to each other and are coupled to the external terminal 30. The negative electrode leads are joined to each other and are coupled to the container part 11.

In this case also, charging and discharging are performed with the battery device of the stacked type. Accordingly, it is possible to achieve similar effects.

EXAMPLES

A description is given of Examples of the present technology according to an embodiment.

Examples 1 to 15 and Comparative Examples 1 to 3

Secondary batteries were fabricated, and thereafter the secondary batteries were each evaluated for a characteristic.

[Fabrication of Secondary Battery]

The secondary batteries (lithium-ion secondary batteries) of the button type illustrated in FIGS. 1 to 5 were fabricated in accordance with a procedure described below.

(Fabrication of Positive Electrode)

First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into a solvent (N-methyl-2-pyrrolidone, an organic solvent), following which the organic solvent was stirred to thereby prepare a positive electrode mixture slurry in a paste form. Thereafter, the positive electrode mixture slurry was applied on the two opposed surfaces of the positive electrode current collector 21A (a band-shaped aluminum foil having a thickness of 12 μm) by means of a coating apparatus, following which the applied positive electrode mixture slurry was dried to thereby form the positive electrode active material layers 21B. Lastly, the positive electrode active material layers 21B were compression-molded by means of a roll pressing machine. In this manner, the positive electrode 21 was fabricated.

(Fabrication of Negative Electrode)

First, 95 parts by mass of the negative electrode active material (graphite) and 5 parts by mass of the negative electrode binder (polyvinylidene difluoride) were mixed with each other to thereby obtain a negative electrode mixture. Thereafter, the negative electrode mixture was put into a solvent (N-methyl-2-pyrrolidone, an organic solvent), following which the organic solvent was stirred to thereby prepare a negative electrode mixture slurry in a paste form. Thereafter, the positive electrode mixture slurry was applied on the two opposed surfaces of the negative electrode current collector 22A (a band-shaped copper foil having a thickness of 15 μm) by means of a coating apparatus, following which the applied negative electrode mixture slurry was dried to thereby form the negative electrode active material layers 22B. Lastly, the negative electrode active material layers 22B were compression-molded by means of a roll pressing machine. In this manner, the negative electrode 22 was fabricated.

(Preparation of Electrolytic Solution)

The electrolyte salt ($LiPF_6$) was added to the solvent (ethylene carbonate and diethyl carbonate), following which the solvent was stirred. In this case, a mixture ratio (a weight ratio) between ethylene carbonate and diethyl carbonate in the solvent was set to 30:70, and a content of the electrolyte salt was set to 1 mol/kg with respect to the solvent. The electrolyte salt was thereby dissolved or dispersed in the solvent. Thus, the electrolytic solution was prepared.

(Assembly of Secondary Battery)

First, by means of a resistance welding method, the positive electrode lead 61 (aluminum) was welded to the positive electrode current collector 21A of the positive electrode 21, and the negative electrode lead 62 (aluminum) was welded to the negative electrode current collector 22A of the negative electrode 22. In this case, the positive electrode lead 61 was used whose periphery was covered in part by the sealant 80 (a polyimide tape).

Thereafter, the positive electrode 21 and the negative electrode 22 were stacked on each other with the separator 23 (a polyethylene film having a thickness of 10 μm) interposed therebetween, following which the stack of the positive electrode 21, the negative electrode 22, and the separator 23 was wound to thereby fabricate the wound body 20Z having the winding center space 20K.

Thereafter, the wound body 20Z and the insulating plate 70 were placed into the container part 11 (SUS316) through the opening 11K. In this case, a welding electrode was inserted into the winding center space 20K to thereby weld the negative electrode lead 62 to the container part 11 by means of a resistance welding method.

Thereafter, the electrolytic solution was injected into the container part 11 through the opening 11K, following which the cover part 12 (SUS316) was welded to the container part 11 by means of a laser welding method. The cover part 12 had the external terminal 30 (aluminum) and the auxiliary terminal 40 (aluminum) adhered (thermally welded) thereto via the gasket 51 (including polypropylene and having a thickness of 0.07 mm) and the gasket 52 (including polypropylene and having a thickness of 0.07 mm). In this case, the positive electrode lead 61 was welded to the external terminal 30, through the through hole 12K provided in the cover part 12, by means of a resistance welding method.

In a case of preparing the cover part 12 having the external terminal 30 and the auxiliary terminal 40 adhered thereto via the gaskets 51 and 52, the range of provision of the gasket 51 was adjusted to thereby select adhesion or non-adhesion of the peripheral end part 30P to the cover part 12, as listed in Table 1. In the "Adhesion of peripheral end part" column in Table 1, a case where the peripheral end part 30P was adhered to the cover part 12 via the gasket 51 (FIG. 3) is indicated by "Yes", and a case where the peripheral end part 30P was not adhered to the cover part 12 via the gasket 51 (FIG. 7) is indicated by "No".

The wound body 20Z (including the positive electrode 21, the negative electrode 22, and the separator 23) was thus impregnated with the electrolytic solution. In this manner, the battery device 20 was fabricated, and the cover part 12 was welded to the container part 11 to thereby form the outer package can 10. As a result, the battery device 20 and other components were sealed in the outer package can 10. The secondary battery was thus assembled.

In a case of assembling the secondary battery, as described in Table 1, the outer diameter D1 (mm) and the thickness T1 (mm) of the cover part 12 and the outer diameter D2 (mm) and the thickness T2 (mm) of the external terminal 30 were varied to thereby vary each of the outer diameter ratio RD and the thickness ratio RT.

(Stabilization of Secondary Battery)

The secondary battery after being assembled was charged and discharged for one cycle in an ambient temperature environment (at a temperature of 23° C.). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 3.0 V. Note that 0.1 C was a value of a current that caused the battery capacity (a theoretical capacity) to be completely discharged in 10 hours, and 0.05 C was a value of a current that caused the battery capacity to be completely discharged in 20 hours.

As a result, a film was formed on the surface of each of the positive electrode 21 and the negative electrode 22 to electrochemically stabilize the state of the secondary battery. Thus, the secondary battery was completed.

The secondary batteries were each evaluated for a characteristic, i.e., a deformation resistance characteristic. The evaluation revealed the results presented in Table 1.

(No Swelling-Defect Rate)

In a case of evaluating the deformation resistance characteristic, a no swelling-defect rate (%) serving as an index for evaluating the deformation resistance characteristic was investigated.

In this case, first, the secondary battery was charged in an ambient temperature environment. Charging conditions were similar to the charging conditions employed for the stabilization of the secondary battery described above. Thereafter, the charged secondary battery was stored (for a storage period of 24 hours) in a high-temperature environment (at a temperature of 60° C.).

Thereafter, whether the peripheral end part 30P was warped outward due to an increase in the internal pressure of the outer package can 10 was visually checked to thereby determine whether the secondary battery was non-defective. In this case, 100 secondary batteries were used to check the presence or absence of warping of the peripheral end part 30P, that is, the number of test samples was set to 100. It was determined that the secondary battery was non-defective if the peripheral end part 30P was not warped. It was determined that the secondary battery was defective if the peripheral end part 30P was warped.

Lastly, the no swelling-defect rate was calculated based on the following calculation expression: no swelling-defect rate (%)=(number of non-defective samples/100)×100.

(No Thickness-Defect Rate)

Further, a no thickness-defect rate (%) serving as another index for evaluating the deformation resistance characteristic was investigated.

In this case, first, as described above, the cover part 12 was welded to the container part 11 by means of a laser welding method in the process of assembling the secondary battery. The gasket 51 was thus heated under heat generated upon the welding.

Thereafter, whether the peripheral end part 30P was lifted due to raising of a portion of the gasket 51 (an increase in thickness of a portion of the gasket 51) caused by melting of the gasket 51 upon the welding was visually checked to thereby determine whether the secondary battery was non-defective. In this case, 100 secondary batteries were used to check the presence or absence of lifting of the peripheral end part 30P, that is, the number of test samples was set to 100. It was determined that the secondary battery was non-defective if the peripheral end part 30P was not lifted. It was determined that the secondary battery was defective if the peripheral end part 30P was lifted.

Lastly, the no thickness-defect rate was calculated based on the following calculation expression: no thickness-defect rate (%)=(number of non-defective samples/100)×100.

TABLE 1

| | Adhesion of peripheral end part | Cover part | | External terminal | | Outer diameter ratio RD | Thickness ratio RT | No swelling-defect rate (%) | No thickness-defect rate (%) |
|---|---|---|---|---|---|---|---|---|---|
| | | Outer diameter D1 (mm) | Thickness T1 (mm) | Outer diameter D2 (mm) | Thickness T2 (mm) | | | | |
| Example 1 | Yes | 12 | 0.1 | 5.0 | 0.15 | 0.42 | 0.67 | 80 | 100 |
| Example 2 | Yes | 12 | 0.1 | 5.4 | 0.15 | 0.45 | 0.67 | 100 | 100 |
| Example 3 | Yes | 12 | 0.1 | 7.2 | 0.15 | 0.60 | 0.67 | 100 | 100 |
| Example 4 | Yes | 12 | 0.1 | 8.2 | 0.15 | 0.68 | 0.67 | 100 | 100 |
| Example 5 | Yes | 12 | 0.1 | 9.2 | 0.15 | 0.77 | 0.67 | 100 | 100 |
| Example 6 | Yes | 12 | 0.1 | 10.2 | 0.15 | 0.85 | 0.67 | 100 | 100 |
| Example 7 | Yes | 12 | 0.1 | 10.8 | 0.15 | 0.90 | 0.67 | 100 | 100 |
| Example 8 | Yes | 12 | 0.1 | 10.9 | 0.15 | 0.91 | 0.67 | 100 | 65 |
| Example 9 | Yes | 7 | 0.1 | 3.2 | 0.15 | 0.46 | 0.67 | 100 | 100 |
| Example 10 | Yes | 16 | 0.1 | 7.2 | 0.15 | 0.45 | 0.67 | 100 | 100 |
| Example 11 | Yes | 12 | 0.04 | 7.2 | 0.15 | 0.60 | 0.27 | 60 | 100 |
| Example 12 | Yes | 12 | 0.05 | 7.2 | 0.15 | 0.60 | 0.33 | 70 | 100 |
| Example 13 | Yes | 12 | 0.06 | 7.2 | 0.15 | 0.60 | 0.40 | 100 | 100 |
| Example 14 | Yes | 12 | 0.07 | 10.8 | 0.15 | 0.90 | 0.47 | 100 | 100 |
| Example 15 | Yes | 12 | 0.09 | 7.2 | 0.15 | 0.60 | 0.90 | 100 | 100 |
| Comparative example 1 | No | 12 | 0.1 | 7.2 | 0.15 | 0.60 | 0.67 | 0 | 100 |
| Comparative example 2 | Yes | 12 | 0.1 | 7.2 | 0.05 | 0.60 | 1.50 | 7 | 100 |
| Comparative example 3 | Yes | 12 | 0.1 | 7.2 | 0.1 | 0.60 | 1.00 | 23 | 100 |

As indicated in Table 1, a deformation condition of the secondary battery including the external terminal 30 adhered to the cover part 12 via the gasket 51 varied depending on the configuration of the secondary battery.

In a case where the peripheral end part 30P was not adhered to the cover part 12 via the gasket 51 although the thickness T2 of the external terminal 30 was greater than the thickness T1 of the cover part 12 (Comparative example 1), the no swelling-defect rate markedly deteriorated.

Further, also in a case where the thickness T2 of the external terminal 30 was less than or equal to the thickness T1 of the cover part 12 although the peripheral end part 30P was adhered to the cover part 12 via the gasket 51 (Comparative examples 2 and 3), the no swelling-defect rate markedly deteriorated similarly.

In contrast, in a case where the thickness T2 of the external terminal 30 was greater than the thickness T1 of the cover part 12 and where the peripheral end part 30P was adhered to the cover part 12 via the gasket 51 (Examples 1 to 15), the no swelling-defect rate was greatly improved.

In this case, in particular, if the thickness ratio RT was within the range from 0.40 to both inclusive, the no swelling-defect rate further increased. In addition, if the outer diameter ratio RD was within the range from 0.45 to 0.90 both inclusive, not only the no swelling-defect rate was further improved but also the no thickness-defect rate was improved.

The results presented in Table 1 indicate that, in the case where the peripheral end part of the external terminal 30 was adhered to the cover part 12 via the gasket 51 and where the thickness T2 of the external terminal 30 was greater than the thickness T1 of the cover part 12, deformation of the secondary battery was suppressed. Accordingly, it was possible to achieve a superior deformation resistance characteristic.

Although the present technology has been described above with reference to one or more embodiments including Examples, the configuration of the present technology is not limited thereto, and is therefore modifiable in a variety of suitable ways.

For example, although the description has been given of the case where the electrode reactant is lithium, the electrode reactant is not particularly limited. Accordingly, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited thereto. Accordingly, the present technology may achieve any other suitable effect.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
- an outer package member;
- a battery device contained inside the outer package member;
- an electrode terminal disposed on an outer side of the outer package member; and
- an adhesive member having an insulating property and disposed between the electrode terminal and the outer package member, wherein
- the outer package member includes
  - a container part having an opening and containing the battery device inside, and
  - a cover part closing the opening and joined to the container part,
- a portion or all of a peripheral end part of the electrode terminal is adhered to the cover part via the adhesive member, and
- the electrode terminal has a thickness greater than a thickness of the cover part,
- wherein a ratio of the thickness of the cover part to the thickness of the electrode terminal is greater than or equal to 0.40 and less than or equal to 0.67.

2. The secondary battery according to claim 1, wherein a ratio of an outer diameter of the electrode terminal to an outer diameter of the cover part is greater than or equal to 0.45 and less than or equal to 0.90.

3. The secondary battery according to claim 1, wherein
- the cover part includes a recessed part,
- at the recessed part, the cover part is bent so as to be partly recessed toward an inside of the container part, and
- the electrode terminal is disposed inside the recessed part.

4. The secondary battery according to claim 3, wherein
- the cover part has a bottom surface and an inner wall surface inside the recessed part, and
- the portion or all of the peripheral end part of the electrode terminal is adhered to each of the bottom surface and the inner wall surface via the adhesive member.

5. The secondary battery according to claim 1, wherein
- the battery device includes a positive electrode and a negative electrode,
- one of the positive electrode or the negative electrode is electrically coupled to the electrode terminal, and
- another of the positive electrode or the negative electrode is electrically coupled to the outer package member.

6. The secondary battery according to claim 1, wherein the secondary battery has a flat and columnar shape.

7. The secondary battery according to claim 1, wherein the secondary battery comprises a lithium-ion secondary battery.

8. A secondary battery comprising:
- an outer package member;
- a battery device contained inside the outer package member;
- an electrode terminal disposed on an outer side of the outer package member; and
- an adhesive member having an insulating property and disposed between the electrode terminal and the outer package member, wherein
- the outer package member includes
  - a container part having an opening and containing the battery device inside, and
  - a cover part closing the opening and joined to the container part,
- a portion or all of a peripheral end part of the electrode terminal is adhered to the cover part via the adhesive member, and
- the electrode terminal has a thickness greater than a thickness of the cover part,
- wherein the cover part includes a recessed part,
- wherein at the recessed part, the cover part is bent so as to be partly recessed toward an inside of the container part, and
- wherein the electrode terminal is disposed inside the recessed part.

9. The secondary battery according to claim 8, wherein a ratio of the thickness of the cover part to the thickness of the electrode terminal is greater than or equal to 0.40 and less than or equal to 0.67.

10. The secondary battery according to claim 8, wherein a ratio of an outer diameter of the electrode terminal to an outer diameter of the cover part is greater than or equal to 0.45 and less than or equal to 0.90.

11. The secondary battery according to claim 8, wherein
- the cover part has a bottom surface and an inner wall surface inside the recessed part, and
- the portion or all of the peripheral end part of the electrode terminal is adhered to each of the bottom surface and the inner wall surface via the adhesive member.

12. The secondary battery according to claim 8, wherein
- the battery device includes a positive electrode and a negative electrode,
- one of the positive electrode or the negative electrode is electrically coupled to the electrode terminal, and
- another of the positive electrode or the negative electrode is electrically coupled to the outer package member.

13. The secondary battery according to claim 8, wherein the secondary battery has a flat and columnar shape.

14. The secondary battery according to claim 8, wherein the secondary battery comprises a lithium-ion secondary battery.

* * * * *